United States Patent
Brodeur, Jr.

(10) Patent No.: US 6,187,865 B1
(45) Date of Patent: Feb. 13, 2001

(54) RUBBER COMPOSITIONS AND LAMINATES THEREOF

(75) Inventor: Edouard A Brodeur, Jr., Marietta, GA (US)

(73) Assignee: Ludlow Composites Corporation, Fremont, OH (US)

(*) Notice: Under 35 U.S.C. 154(b), the term of this patent shall be extended for 0 days.

(21) Appl. No.: 09/212,883

(22) Filed: Dec. 16, 1998

(51) Int. Cl.$^7$ ................ C08F 8/00; C08F 9/00; C08F 23/00; C08L 27/04; C08L 33/00
(52) U.S. Cl. ............ 525/191; 525/213; 525/214; 525/217; 525/222; 525/227; 525/232; 525/233; 525/235; 525/240
(58) Field of Search ................ 525/191, 213, 525/214, 217, 222, 227, 232, 233, 235, 240

(56) References Cited

U.S. PATENT DOCUMENTS

| | | |
|---|---|---|
| 3,708,388 | 1/1973 | Lindemann et al. . |
| 3,799,904 | 3/1974 | Ogasawara et al. . |
| 4,303,571 * | 12/1981 | Jansen et al. ................ 524/426 |
| 4,348,502 | 9/1982 | Coran et al. . |
| 4,418,483 * | 12/1983 | Fujita et al. ................ 36/28 |
| 4,505,984 | 3/1985 | Stelzer et al. . |
| 4,639,487 * | 1/1987 | Hazelton et al. ............ 524/425 |
| 4,804,577 * | 2/1989 | Hazelton et al. ............ 442/351 |
| 4,997,880 * | 3/1991 | Groep ........................ 525/57 |
| 5,100,704 | 3/1992 | Iwakura et al. . |
| 5,352,158 | 10/1994 | Brodeur, Jr. . |
| 5,403,892 * | 4/1995 | Puydak et al. ................ 525/192 |
| 5,498,476 | 3/1996 | Tucker et al. . |
| 5,675,915 | 10/1997 | Faughn et al. . |
| 5,750,246 | 5/1998 | Yuasa et al. . |

* cited by examiner

*Primary Examiner*—Nathan M. Nutter
(74) *Attorney, Agent, or Firm*—Emch, Schaffer, Schaub & Porcello Co., L.P.A.

(57) ABSTRACT

These articles relate to rubber compositions and laminates thereof. The laminates bring together materials not easily bonded to each other. The compositions comprise rubber and a resin component containing ethylene-vinyl acetate copolymer (EVA). The laminates are useful for providing a protective covering such as shelf or drawer liners.

17 Claims, No Drawings

RUBBER COMPOSITIONS AND LAMINATES THEREOF

TECHNICAL FIELD

This invention relates to rubber compositions and laminates thereof. The laminates bring together materials not easily bonded to each other.

BACKGROUND ART

An example of a product where materials are not easily bonded together is a shelf liner. Usually vinyl foams or vinyl solid films are laminated to a non-slip pad or a waterproof layer. The composite of layers produces a protective film covering for a shelf or the bottom of a drawer. This protective laminate stays in place by virtue of a pressure sensitive adhesive or a foam non-slip pad either separate or attached to the under side of the waterproof surface. The products on the market as of this time represent foam layers of vinyl in many geometric conformities from solid to open mesh products either by themselves or laminated to a solid polymeric film. The open mesh product has a plurality of open cells extending through the pad from the top side to the bottom side. Another currently found product is a preprinted vinyl film of assorted designs and colors adhesively laminated to a layer of open cell latex foam cast and cured to a fabric substrate, prior to lamination. Many inherent problems are found in this product emanating from the laminating heats involved in the formation of the composite, as well as the differential expansion and contraction characteristics of the multiple layers involved. In addition, the multiple processes involved in all of these increase the cost above the value of the product.

DISCLOSURE OF THE INVENTION

Compositions of the invention comprise rubber and a resin component containing at least one ethylene-vinyl acetate copolymer (EVA). My compositions are formulations of a foam energy absorbent pad of a suitable thickness that is formulated to a sufficient degree of surface tack to stay in place and cling to a wide variety of smooth horizontal planes, as well as vertical planes.

The pads can be cast and cured directly on polyvinyl, polypropylene, polyester and olefinic films with excellent adhesion to these films without the use of adhesives, or transition layers of any kind. The product is further formulated to possess effective flex modulus, as well as sufficient resistance to distortion, such that the resulting composite is readily converted into a compact wrinkle free roll that can be wound and unwound without sticking to itself, wrinkling or distorting. Commonly used foams and vinyl films that are found in this type application require the incorporation of a scrim into the composite for sufficient web firmness to permit ease of handling, as well as forming a transition layer between the backing and the top layer. Commonly used foams and films found in this type of application usually require the addition of a pressure sensitive adhesive to stay in place.

In addition, industry has not been able to cast curable foams on a thin thermoplastic web. The type of equipment and conditions that are found in the industry do not produce commercially cost competitive finished products in a continuous production line. The thermoplastic membrane softens and sags or melt flows off of restraining and tensioning and stretching conveyors. Casting of the material on a belt is equally unsatisfactory by virtue of the thermal expansion nature of all thermoplastics resulting in permanent creasing of the composite.

The invention further selects materials that are compatible in such a manner that ingredients from one polymer will not migrate or transfer to the other. The invention further results in a unique copolymer matrix of compatibles that will not migrate and transfer plasticizers or any other compounding ingredients to surface finishes, strains and common acrylic, alkyd or urethane paints or blends thereof.

BEST MODE OF CARRYING OUT INVENTION

Compositions of the invention comprise rubber and a resin component containing at least one ethylene-vinyl acetate copolymer (EVA). Ethylene vinyl acetate copolymers useful in the invention contain at least 15% by weight vinyl acetate. The resin component may contain only ethylene vinyl acetate copolymer or a mixture of EVA copolymers.

The rubbers, latexes or elastomers of this invention may vary widely. Examples of such elastomers include neoprene, EPDM, i.e., ethylene-propylene-diene terpolymer, SBR, i.e., styrene-butadiene rubber, nitrile rubber, and chlorinated polyethylene. Other eligible examples of rubbers include chlorosulfonated polyethylene, chlorinated polyethylene, ethylene-propylene rubber, isoprene-isobutylene rubber, chlorinated or brominated butyl rubber, and nitrile-butadiene rubber.

The compositions may also comprise conventional additives such as reinforcing fillers, pigments such as carbon black, and $TiO_2$ dyes, ultraviolet stabilizers, plasticizers, fungicides, extenders, waxes, antioxidants, and the like, in amounts known to those skilled in the art.

Other useful fillers include fumed silica, calcium and magnesium carbonates, calcium and barium sulfates, aluminum silicates, and the like, which may be included in small amounts such that they do not interfere with the physical properties required.

This invention is a unique combination of laminated foams and solid plastomeric materials that produce decorative, non-slip, non-marring, protective, shock absorbing coverings for a variety of purposes. These laminates have the ability to adhere to horizontal and vertical smooth and semi smooth surfaces of any kind without the need for adhesives of any kind.

This invention brings together polymers not generally considered capable of easily being bonded or joined to each other. Vinyl, polyethylene and olefin films are considered difficult to bond to most other type elastomeric films such that adhesives, transition layers, or mechanical means have to be resorted to for simple laminations of unlike polymeric materials.

Weight percent as used herein is based on the total weight of the composition being 100 percent. Molecular weight as used herein means weight average molecular weight. Parts as used herein is are based on weight. Parts are expressed as parts per 100 parts of rubber (PHR). Regarding, the amount of additives and fillers present, the expression "up to" is used herein. The expression is intended to mean effective amounts for the intended purpose which are greater than zero.

The present insertion will be better understood by reference to the following examples.

EXAMPLE I

In one embodiment of the invention, I start with a 4 to 5 mil. impervious vinyl film (0.004–0.005 inches thick) that has been preferably pre-printed on one side with appropriate designs and colors. I then apply this smoothly to a heated carrier while expanded. The vinyl film could be a polyethylene, polyester, or olefin film or varying thickness fro 1 to 10 mils for the purpose of this example. The vinyl film has an ASTM D-882 MD ultimate tensile of 3,000 PSI and an ultimate elongation of (MD) of 300%. The vinyl film is preferably a calendared film, but could also be a cast, an extruded, or blown film. While the film is in a heated pre-expanded state, a latex foam usually frothed through a commercial latex frothed with sufficient air to reduce the density of the foam to 3 to 8 pounds per cubic foot is doctored onto the continuous impervious vinyl film. For specific purposes, the density of the foam could be higher. The wet thickness is sufficient to dry down to a thickness of 20 to 40 mils. The latex foam is formulated of a blend of SBR (Styrene butadienne) synthetic rubber blended with vinyl acetate ethylene copolymer latexes and polyvinyl acetate homopolymer latexes to which we add rosin ester tackifiers. This particular blend of latexes will adhere to the impervious vinyl film and also to polyethylene, polyester and olefins. A small amount of natural rubber latex is often included to adjust the elongation and tensile of the foam to the exact level desired. Too much elongation is not desired to attain the proper balance of adhesion and flex modulus. Compounding ingredients for the SBR latex and the natural rubber are included to properly cure the rubbers. A curing package common to the trade is included to suitably crosslink the natural and SBR latex. Curing of the elastomeric rubber components are necessary to permit warm firmness necessary to properly wind the finished product into a smooth roll. Foaming agents such as laureate soaps or silicone surfactants are necessary.

The film and foam composite is then passed through an oven at temperatures varying from 150° to 350° F. at sufficient speeds to expose the film and foam to these heats for three to five minutes until the water content of the foam is less than 5% and the sulfur and zinc oxide have crosslinked the rubbers sufficiently to withstand normal handling of the product.

All of the impervious elastomeric layers upon which the foam of this invention is cast will expand with heat. Unless they are free to expand while being subjected to drying and curing temperatures, permanent wrinkles will form before the foam has dried and solidified. Since the impervious films of this invention are thermoplastic in nature, they also soften and cannot be mechanically stretched and held in place while the foam heats and sets. In order that belts and carriers common to this trade can be used to carry the composite through the heating, setting and curing ovens, this invention includes preheating of the films before applying the film to the carrier, while also maintaining the carrier at elevated temperatures as the drying process starts. We have found that these temperatures must be above 130° F.

EXAMPLE II

In another embodiment of the invention, the impervious vinyl film is formed by casting a vinyl plastisol on a suitable carrier, gelling the film preferably from the residual heat in the carrier, then printing the impervious film continuously after removal from the carrier and prior to slitting and rolling or packaging. This is all done in one operation in a continuous manner.

EXAMPLE III

In another embodiment of the invention, the vinyl film is a textile fabric that is post printed after curing in the oven prior to slitting and rolling or packaging.

The vinyl film of Example I is not limited to a 4–5 mil. vinyl of definite specifications. We have formed moisture barriers, drop cloths and water proof laminates using 1 mil. vinyl, as well as sports floor coatings, and hardwood floor protective coverings using 10 mil. vinyl. We have used ½ mil. and 1 mil. polyethylene, polyester and olefin films with various thickness backings for various applications from moisture barriers under hardwood flooring and ceramic tiles, as well as moveable drop cloths that cling to walls and ceilings without taping.

By varying the basic compatible components of the polymer package, we can formulate to any degree of surface tack, flex modulus, hardness, hand and strength to weight ratio. All of the above variations are possible while still maintaining good adhesion of the backing to the vinyl, polyethylene and olefin top surface. The following is an example of a formulation specific to a shelf liner backing for a 4 mil. vinyl impervious top layer.

EXAMPLE IV

Latex Foam Formulation for Example I

|  | Dry Parts |
| --- | --- |
| Natural Rubber Latex | 20 Parts/100 Rubber (PHR) |
| Styrene Butadiene Latex | 40 Parts/100 Rubber (PHR) |
| Vinyl Acetate Ethylene Copolymer | 40 Parts/100 Rubber (PHR) |
| Rosin Ester Tack Emulsion | 10 Parts/100 Rubber (PHR) |
| Laureate Soap Foaming Aid | 2 Parts/100 Rubber (PHR) |
| Curing Package | 10 Parts/100 Rubber (PHR) |
| Calcium Carbonate | 50 Parts/100 Rubber (PHR) |
| Antioxidant | 2 Parts/100 Rubber (PHR) |

The natural rubber latex can be any widely used centrifuged or creamed hevea natural rubber latex such as NC 35% from ENNAR adjusted to the proper KOH number and PH value for proper reaction to standard curing agents and accelerators common to the trade. Examples of these are sulfur, zinc oxide and zimates such as ethyl zimate common to the trade. Examples of these are sulfur, zinc oxide and zimates such as ethyl zimate, and/or thiazoles such as Caprax mercaptobenzothiazole from R. T. Vanderbilt. The natural rubber contributes high tensile strength and surface rack to the formulation as well as high elongation at break. These are properties that we only need to compensate for shortcomings of the other polymers used to get adhesion to the impervious top layer. The level of the natural rubber is maintained between 5 and 30% with the higher percentage providing more tack and strength. The higher the percentage of natural in the formulation the greater the tendency of the composite structure to transfer plasticizer from a PVC impervious top layer with resulting swelling of the foam layer. An upward curling of the composite will result from this swelling. Natural rubber by itself will not adhere at all to the top surfaces of this invention.

The styrene butadienne rubber is a low styrene SBR type such as 27% styrene #5356 from Goodyear that will crosslink and cure with the same cure package as incorporated in the formulation for the curing of the natural rubber. The SBR polymer will not adhere in a satisfactory manner either alone or in combination with natural rubber to the top surface of this invention.

The ethylene vinyl acetate (EVA) copolymer is the backbone of this unique blend inasmuch as it will adhere to the vinyl ethylene or olefin impervious film with greater strength than the internal tensile strength of the foam backings that possess tensile strength below 100 pounds per square inch. An example of a EVA copolymer that will have the properties best suited to this application is Air Products' Airflex 7200,440,410 and 4530.

Certain polyurethane aliphatic based latexes work well also, but are far more expensive than the EVA products. One such aliphatic urethane latex is Stahl USA RU-40-439, Witco W212,260,272 and ICI R960,962,966. We have developed satisfactory adhesion with as little as 15% EVA in the total elastomer package. We can vary the EVA from 15% to 50% of the elastomer components of the formulation. A portion of the EVA latex can be replaced with EVA latexes containing tackifiers such as rosin esters and polyterpenses additives and others common to the trade. An Air Products such as flexbond 153 would be an example of such a EVA latex.

The polyvinyl acetate homopolymer is a compatible latex that is characterized by high rigidity. It is capable of being plasticized for enhanced flexibility or blended with more flexible EVA copolymers previously listed. The plasticizers that we have found to perform well are dibutyl phthalate, butyl benzyl phthalate, as well as all commonly used benzoates such as dipropylene diglycol dibenzoate. From 0 to 15 parts VA homopolymer is used to replace filler with resulting added stiffness to the product. It is equally effective as EVA as a migration of plasticizer blocker while working well in conjunction with EVA as an adhesion promoter.

The calcium carbonate in the formulation of Example I is used to reduce tack, stiffen or deaden the foam, as well as provide material costs savings in the formulation. Calcium carbonate is varied from 1 to 200 parts.

With the versatility provided by these mutually compatible polymers and additives, we are able to not only direct cast on the impervious films, but also cast a far thinner film with the properties and feel of a thicker film while materially increasing the processing speed with a reduction the oven dwell time of a given composite.

EXAMPLE V

Suitable Vinyl Impervious Film for Example II

|  | Parts |
| --- | --- |
| Homopolymer Dispersion PVC | 60 |
| Homopolymer or Copolymer Blending PVC | 40 |
| DOP (Dioctyl Phthalate) | 40 |
| Chlorinated Paraffin | 20 |
| Viscosity Depressant (Lecithin) | 1 |
| Heat Stabilizer (Barium Zinc Salt) | 2 |

EXAMPLE VI

Suitable Foam Formulation for a Placemat

| Ingredients | Dry |
| --- | --- |
| 33% Styrene SBR Latex | 40 |
| 100% Styrene Latex | 10 |
| Vinyl Acetate Ethylene Copolymer | 40 |
| Polyvinyl Acetate Homopolymer | 10 |
| Laureate Foaming Soap | 2 |

-continued

| Ingredients | Dry |
| --- | --- |
| Curing Package | 10 |
| Calcium Carbonate | 100 |

A placemat requires a bulkier product, as well as far less tack to the product. The above foam produces a firmer backing than a product like a shelf liner. In addition, the tack level or coefficient of friction of the placemat should be in the order of 0.8 to 1.2, as opposed to the coefficient of friction of a shelf liner that falls in the range of 1.4 to 1.8. The tack level should not be any higher than what is required for the mat to remain in place under normal use. Too high a tack level leaves the false impression that the mat could harm the table surface.

The shore 00 durometer of the foam for the shelf liner at a 15 to 20 mil. coating thickness and 3 to 4 pounds per cubic foot density is 10 to 15. The shore 00 durometer for the placemat cast to a dried thickness of 40 to 50 mils. at a density of 5 to 8 pounds per cubic foot is 20 to 30.

Although the now preferred embodiments of the invention have been set forth, it will be apparent to those skilled in the art that various changes and modifications may be made thereto without departing from the spirit and scope of the invention as set forth in the following claims.

I claim:

1. A composition consisting essentially of 40 to 80 parts of rubber and 20 to 60 parts of ethylene vinyl acetate copolymer.

2. A composition according to claim 1 wherein the ethylene vinyl acetate copolyer is 15 to 50 percent by weight vinyl acetate.

3. A composition according to claim 1 wherein the ethylene vinyl acetate copolymer is at least 15 weight percent by weight vinyl acetate.

4. A composition according to claim 1 wherein the rubber is a mixture of natural rubber latex and styrene butadiene rubber.

5. A composition according to claim 1 wherein the rubber is a mixture of styrene butadiene rubber and styrene rubber.

6. A composition according to claim 1 including up to 20 parts of polyvinyl acetate homopolymer per 100 parts of rubber.

7. A composition according to claim 1 including up to 5 parts of soap foaming aid per 100 parts of rubber.

8. A composition according to claim 1 including up to 10 parts of curing agent per 100 parts of rubber.

9. A composition according to claim 1 including up to 200 parts of filler per 100 parts of rubber.

10. A composition according to claim 1 including up to 5 parts of antioxidants per 100 parts of rubber.

11. A composition according to claim 1 wherein the rubber is natural rubber latex, styrene butadiene rubber or styrene rubber.

12. A composition according to claim 1 having a low coefficient of friction.

13. A composition according to claim 1 having a coefficient of friction ranging from 0.8 to 1.2.

14. A composition consisting essentially of:

|  | Parts |
|---|---|
| Natural Rubber Latex | 20 |
| Styrene Butadiene Latex | 40 |
| Vinyl Acetate Ethylene Copolymer [Polyvinyl Acetate Homopolymer] | 40 |
| Rosin Ester Tack Emulsion | 10 |
| Laureate Soap Foaming Aid | 2 |
| Curing Agent | 10 |
| Calcium Carbonate | 50 |
| Antioxidant | 2 |

15. A composition according to claim 14 having a low coefficient of friction.

16. A composition consisting essentially of:

| Ingredients | Dry |
|---|---|
| 33% Styrene SBR Latex | 40 |
| 100% Styrene Latex | 10 |
| Vinyl Acetate Ethylene Copolymer | 40 |
| Polyvinyl Acetate Homopolymer | 10 |
| Laureate Foaming Soap | 2 |
| Curing Agent | 10 |
| Calcium Carbonate | 100 |

17. A composition according to claim 16 having a low coefficient of friction.

* * * * *